June 4, 1963        H. T. DUDLEY        3,091,882
ILLUMINATED DECOY AND LURE FOR FISHING
Filed June 17, 1959        2 Sheets-Sheet 1
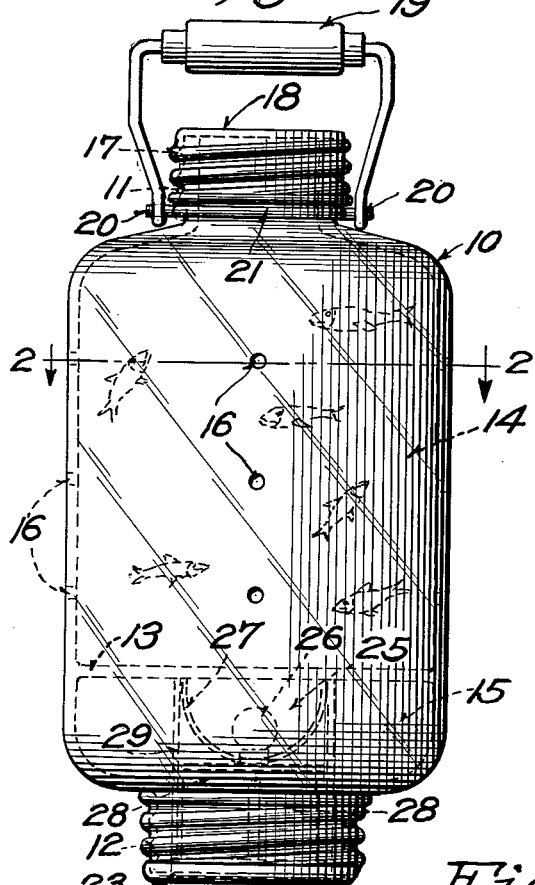
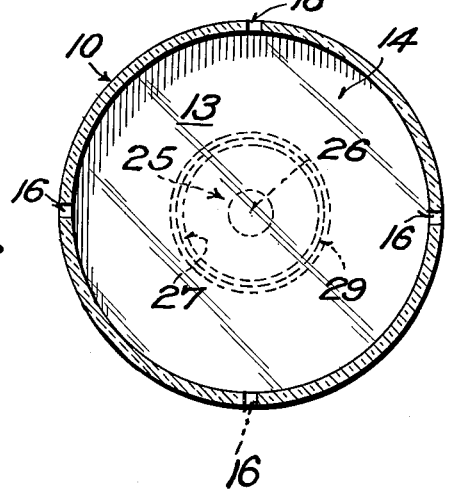
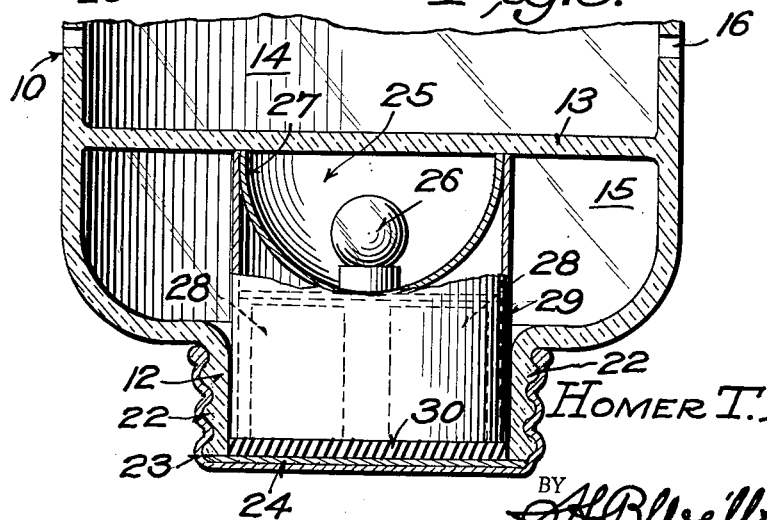
INVENTOR
HOMER T. DUDLEY,
BY H. B. Wellson & Co.
ATTORNEY June 4, 1963  H. T. DUDLEY  3,091,882
ILLUMINATED DECOY AND LURE FOR FISHING
Filed June 17, 1959  2 Sheets-Sheet 2

HOMER T. DUDLEY
*INVENTOR.*

BY *James R. Head*
ATTORNEY

United States Patent Office 3,091,882
Patented June 4, 1963

3,091,882
ILLUMINATED DECOY AND LURE FOR FISHING
Homer T. Dudley, 2819 N. Garrison, Tulsa, Okla.
Filed June 17, 1959, Ser. No. 13,975
1 Claim. (Cl. 43—17.5)

This invention relates to devices used by fishermen, and more particularly to an improved illuminated decoy to hold a number of live minnows and to be submerged in the water for attracting fish to the water area surrounding the device so that the fish may be caught with a line and baited hook in the usual manner of fishing.

The principal object of the invention is to provide an illuminated lure or decoy of this character which is highly effective in use and at the same time of simple and comparatively inexpensive construction.

Another object of the invention is to provide a device of this character with an upright body or container of transparent material having a transverse partition in its lower portion, forming upper and lower chambers; the upper chamber being perforated for the circulation of water and of a size to hold a large number of minnows so that they resemble a school of swimming minnows, and the lower compartment being air tight and holding a lighting unit which throws a strong beam of light upwardly through the partition to illuminate the minnows in the upper compartment.

Another object is to provide a device of this character having an upright elongated body made of transparent glass or plastic with reduced neck portions at its top and bottom and an intermediate transverse partition dividing the interior of the body into a large perforated upper compartment of a size to hold many live minnows, and a lower sealed or air tight compartment to hold a lighting unit consisting of electric lamp bulb, reflector and dry cell batteries, for strongly illuminating the minnows swimming about in the upper compartment, the lower neck portion being closed by a removable cap which retains the lighting unit in position, and the upper neck portion being closed by a similar cap which is removable to permit the introduction and removal of the minnows.

With the above and other objects and advantages in view, the invention resides in the novel combinations and arrangements of parts and the novel features of construction hereinafter described and claimed, and illustrated in the accompanying drawings which show the present preferred embodiments of the invention.

In the drawings:

FIGURE 1 is a side elevation on a reduced scale of the improved fish lure or decoy.

FIGURE 2 is a horizonal section taken on line 2—2 in FIGURE 1.

FIGURE 3 is an enlarged central vertical section through the lower portion of the device.

Description

Figure 4:
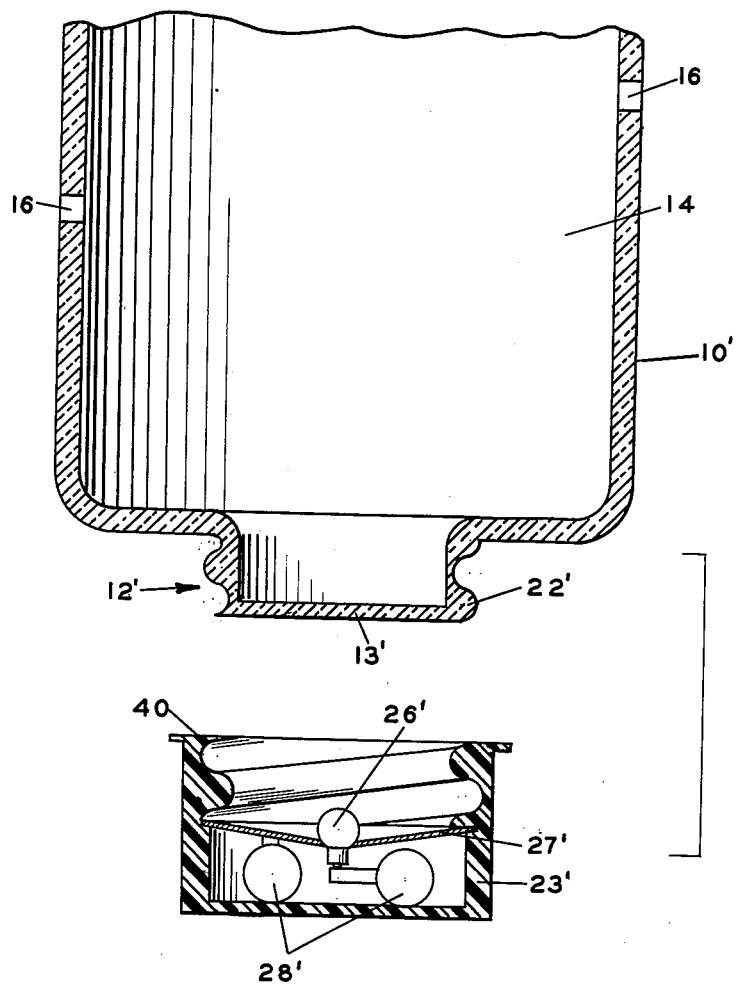
FIGURE 4 illustrates an additional embodiment of this invention.

Referring more in detail to the drawings, the numeral 10 denotes the decoy body made of transparent glass or one of the modern plastics. It is preferably of elongated cylindrical form with reduced and concentric cylindrical necks 11 and 12 at its upper and lower ends respectively, and an integral transverse partition 13 between its ends. In one embodiment, the transparent partition divides the bottle-like body 10 into two separate compartments, preferably a large upper chamber 14 and a smaller lower chamber 15. While the body may vary in size, it is preferably about 10 inches in diameter and has a height of about 19 inches so that one chamber, preferably the upper one, will be large enough to hold many minnows or like live creatures that can swim about in the water of the chamber 14. The walls of the latter are formed with a suitable number of holes 16 which permit the circulation of water through the chamber when the latter is submerged and which are of insufficient size to permit the minnows to escape. The minnows are introduced through the neck 11 which is preferably externally screw threaded as at 17, for engagement by a perforated screw closure cap 18. The body is preferably provided with a pivoted bail handle 19 so that it may be readily carried. The two arms of the U-shaped handle are engaged with diametrical pivot pins 20 on a metal ring 21 surrounding the neck 11 beneath the lowermost screw thread. To lower and suspend the device in the water a suitable line (not shown) may be attached to the handle.

The neck portion 12 at the bottom of the body is also preferably externally screw threaded as at 22 for engagement by a closure cap 23 of metal or plastic material. In order to render the lower chamber 15 air tight, a suitable packing ring or disk 24 of rubber or rubber-like material is interposed between the cap and the lower end of the neck 12. The cap or closure 23 not only seals the chamber 15, but serves to properly position a lighting unit designated as a whole by the numeral 25. The unit includes a miniature electric lamp bulb 26, a reflector 27 surrounding the bulb, two dry cells 28 and suitable electrical connections similar to those in the commonly used hand flashlights. These parts are mounted in a cylindrical casing 29 of non-conducting material. The casing 29 has a diameter slightly less than the internal diameter of the neck 12, and its length is such that its upper end will be pressed against the bottom face of the partition 13 by a resilient rubber cushion 30 disposed in the neck between the cap 23 and the bottom of the casing as shown in FIGURE 3. It will be seen that when the light unit is placed in the neck and the cap screwed thereon, the cylindrical cushion 30 will be compressed and the unit yieldingly retained in the device. The light rays from the lamp and reflector will be thrown upwardly through the partition 13 to illuminate the minnows swimming about in the upper chamber. There is some reflected light energy from the bottom side of cap 18. Since the circular closure 23 is concentric with the axis of the body and has a flat outer face, it may be used to support the device in an upright position on a horizontal surface while the minnows are being placed in the upper chamber. Holes 16 are placed at an elevation to allow a static pool of water to remain in the chamber while filling or maintaining the body out of the water. A large number of minnows are used so that they appear as a school of minnows and since they are illuminated they will attract large fish to the water area surrounding the device. The latter is placed at any chosen depth in the water by a rope or other line, and the fisherman drops his hook, baited with a live minnow or other bait adjacent the device.

In the embodiment of FIGURE 4, transparent partition 13' extends across the lower neck portion 12'. External threads 22' are adapted to engage with internal matching threads of resilient closure cap 23'. The cap is maintained air-tight by tightening cap 23' onto the lower portion 12' with lip 40 compressible engaging the body 10'. The cap 23' contains bulb 26' and metallic reflector 27' surrounding the bulb. Two dry cell batteries 28' are electrically connected with the conductive reflector 27' and bulb 26' to complete the circuit when cap 23' is threadably connected at 12'.

From the foregoing, taken in connection with the accompanying drawings, it will be seen that novel and advantageous provision has been made for carrying out the objects of the invention, and while preferences have been disclosed, attention is invited to the possibility of making variations within the scope of the invention as claimed.

I claim:

An illuminated fish decoy to be submerged in a body of water, comprising,
- a one piece elongated body of transparent material having an exteriorly threaded neck portion at the lower end of said body,
- a planar end wall integrally closing the lower end of said neck portion to form a large compartment in said body for live bait,
- the side wall of said compartment being perforated for the circulation of water therethrough when the decoy is submerged,
- a compartment having an opening at the upper end of said body for the introduction of live bait,
- a removable closure for said opening,
- a removable resilient cap forming a compartment and adapted to be threadably engaged with said neck portion and compressibly sealed against said body adjacent the upper end of said neck portion, and
- a battery powered illuminating means retained within said removable cap and providing illumination directed upwardly through said end wall.

References Cited in the file of this patent

UNITED STATES PATENTS

| | | |
|---|---|---|
| 373,333 | Brosch | Nov. 15, 1887 |
| 636,694 | Pflueger | Nov. 7, 1899 |
| 777,382 | Le Beau | Dec. 13, 1904 |
| 1,389,132 | Galavan | Aug. 30, 1921 |
| 1,723,272 | Emma | Aug. 6, 1929 |
| 1,876,692 | Kornsweet | Sept. 13, 1932 |
| 2,250,942 | Allin | July 29, 1941 |
| 2,550,988 | Flournoy | May 1, 1951 |
| 2,740,220 | Caplan | Apr. 3, 1956 |
| 2,754,610 | Carlson | July 17, 1956 |
| 2,898,698 | Bair | Aug. 11, 1959 |
| 2,908,101 | Butler | Oct. 13, 1959 |
| 2,908,993 | Webb | Oct. 20, 1959 |